US006988180B2

(12) United States Patent
Kadatch (10) Patent No.: US 6,988,180 B2
(45) Date of Patent: Jan. 17, 2006

(54) METHOD AND APPARATUS FOR LOCK-FREE, NON-BLOCKING HASH TABLE (75) Inventor: Andrew V. Kadatch, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 302 days.

(21) Appl. No.: 10/674,176

(22) Filed: Sep. 29, 2003

(65) Prior Publication Data

US 2005/0071335 A1    Mar. 31, 2005

(51) Int. Cl.
G06F 12/10    (2006.01)

(52) U.S. Cl. .......................... 711/216; 711/221; 707/3; 707/4; 707/104.1

(58) Field of Classification Search ................. 711/216
See application file for complete search history.

(56) References Cited

U.S. PATENT DOCUMENTS

| 5,047,918 | A | * | 9/1991 | Schwartz et al. ........... 707/203 |
| 5,412,384 | A | * | 5/1995 | Chang et al. ................. 341/79 |
| 6,360,220 | B1 | | 3/2002 | Forin ............................. 707/8 |
| 6,457,173 | B1 | * | 9/2002 | Gupta et al. ................ 717/149 |
| 2002/0174405 | A1 | * | 11/2002 | Janssen ........................... 716/3 |
| 2004/0054807 | A1 | * | 3/2004 | Harvey et al. .............. 709/243 |

OTHER PUBLICATIONS

Maged M. Michael, "Safe Memory Reclamation for Dynamic Lock-Free Objects Using Atomic Reads and Writes," In *the 21st Annual ACM Symposium on Principles of Distributed Computing,* pp. 21-30, Jul. 2002.

Maged M Michael, "High Performance Dynamic Lock-Free Hash Tables and List-Based Sets," In *the 14th Annual ACM Symposium on Parallel Algorithms and Architectures,* pp. 73-82, Aug. 2002.

Maged M. Michael and Michael L. Scott, "Correction of a Memory Management Method for Lock-Free Data Structures," Technical Report TR599, Computer Science Department, University of Rochester, Dec. 1995.

Maged M. Michael and Michael L. Scott, "Simple Fast, and Practical non-Blocking and Blocking Concurrent Queue Algorithms," In *Proceedings of the 15th Annual ACM Symposium on Principles of Distributed Computing,* pp. 267-275, May 1996.

John D. Valois, "Implementing Lock-Free Queues," In the *7th International Conference on Parallel and Distributed Computing Systems,* Las Vegas, NV, Oct. 1994.

John D. Valois, "Lock-Free Linked Lists Using Compare-and-Swap," In *Proceedings of the 14th Annual ACM Symposium on Principles of Distributed Computing, International Conference on Parallel and Distributed Computing,* pp. 214-222, Aug. 1995.

* cited by examiner

*Primary Examiner*—B. James Peikari
(74) *Attorney, Agent, or Firm*—Theodore M. Magee; Westman, Champlin & Kelly, P.A.

(57) ABSTRACT

A method and apparatus are provided for an efficient lock-free, non-blocking hash table. Under one aspect, a linked list of nodes is formed in the hash table where each node includes a protected pointer to the next node in the list and a reference counter indicating the number of references currently made to the node. The reference counter of a node must be zero and none of the protected pointers in a linked list can be pointing at the node before the node can be destroyed. In another aspect of the invention, searching for a node in the hash table with a particular key involves examining the hash signatures of nodes along a linked list and only comparing the key of a node to a search key of the node if the hash signature of the node matches a search hash signature.

31 Claims, 10 Drawing Sheets

METHOD AND APPARATUS FOR LOCK-FREE, NON-BLOCKING HASH TABLE

BACKGROUND OF THE INVENTION

The present invention relates to hash tables. In particular, the present invention relates to the efficient implementation of a hash table in a multi-process environment.

A hash table consists of a set of buckets that are addressed by applying a hashing function to a data key associated with data to be stored or retrieved from a hash table. Because of limited resources, a hash table typically only has a finite number of buckets into which the data keys may be assigned. As a result, it is possible that more than one data key may be assigned to the same bucket in the hash table.

To deal with such collisions of data keys, it is common to use a method known as chaining in which the hash function indexes a pointer to a linked list of nodes, where each node contains a key and the data associated with the key. Because it is a linked list, each node also includes a pointer to the next node in the linked list.

In such systems, data is added to the hash table by first applying a hash function to the data's key. This hash function generates a hash signature, which may be used directly to address the individual buckets within the hash table. However, to ensure that each hash signature is associated with a bucket within the finite space of the hash table, it is common to apply a modulo N function to the hash signature where N is the number of buckets in the hash table. Once the bucket has been identified, a new node is inserted into the bucket's linked list and the node is populated with the data and key.

To look up data in a hash table, the key for the data is applied to the hash function to identify the bucket that contains the data. The keys in each node of the linked list associated with that bucket are then compared to the search key. A pointer to the node that contains the matching key is returned if a matching key is found.

To delete data from the hash table, the key is first used to find the data as described above. The node is then removed from the linked list.

In multi-process or multi-threaded environments, it is possible for many different processes or threads to want to access or change a hash table. To avoid corruption of the hash table, early systems locked the entire hash table or individual nodes in the hash table when a process was using the table or the entry. This prevented parallel processes from taking actions on the table that were incompatible with each other and that would lead to corruption of the data. For example, by locking the table, it was possible to prevent two processes from separately adding different nodes for a same data key.

Locking the entire hash table or a node in the hash table is undesirable since it forces one process to wait while another process is using the hash table. To overcome this problem, lock-free hash tables have been developed. However, the lock-free implementations have had several deficiencies.

For example, during traversal of the linked list, many systems require a large number of computationally expensive memory operations. For example, in one system, synchronous memory writes are used during traversal of the linked list. Such memory writes force the processor to update a memory location immediately instead of allowing the processor to fill a local memory buffer before updating the memory when it is most efficient for the processor. In other systems, interlocked operations are used in which a value stored in memory is compared to an expected value and is replaced with a new value if the stored value matches the expected value. If the stored value does not match, the stored value is not changed and is returned. Examples of such interlocked operations include compare-and-swap (CAS) and Interlocked Compare and Exchange (ICE). Other systems rely on very complicated data structures that require overly complex algorithms for their management.

Using such computationally intensive instructions at each traversal of a node along a linked list makes traversal computationally expensive. Since every option performed on a hash table involves a traversal, using such instructions for each traversal slows the operation of the hash table.

Some lock-free implementations have been developed that rely on special hardware support, for example special micro-processors that support unique processor instructions or precision timers that are perfectly synchronized across all central processing units. Reliance on such specialized hardware is undesirable because it limits the environments in which the hash tables may be executed.

Other lock-free implementations have been developed that do not lock the table but that allow different threads to block each other. Such systems are subject to live-lock conditions in which two threads try to accomplish an operation on a same hash node and as a result block the progress of each other indefinitely.

In addition, lock-free hash tables of the past have not had an efficient means for managing memory. Typically, in order to reduce the amount of memory used by the hash table, nodes are treated as independent objects that can be inserted into any linked list in the hash table and that may be reused after being removed from the linked list and marked as destroyed.

However, an object cannot be marked as destroyed until all of the applications or processes are done using the object. Thus, there must be some way to determine when a node is no longer being used so that it can be destroyed.

Some lock-free hash tables of the prior art have relied on system-based garbage collection for deleting unused nodes. In such garbage collection schemes, a system process that is separate from the hash table determines what objects are currently being used by running applications. Objects that are not being used by any of the applications are then destroyed. These systems are less than ideal because they require that the hash table be implemented in a particular computing environment and thus limit the portability of the hash table.

In other systems, a special memory management protocol is added to every application so that each application provides a list of all of the objects it is currently using. When an application is done using an object, it checks with every other application to see if it can delete the object. When another application is using the object, the deletion is postponed until that application is no longer using the object. This creates a possibly infinite delay in deleting objects that is undesirable. It also requires every application to be written in this manner.

Outside of the area of multi-process linked lists, reference counters have been used to determine when an object may be destroyed. In such systems, a counter in the object is incremented each time an application is given a pointer to the object and is decremented each time an application releases the pointer. If the reference counter reaches 0, the object may be destroyed.

Although such reference counters have been used outside of linked lists, it is difficult to use such reference counters in a multi-process environment in which the objects are nodes in a linked list. The reason for this is that the node's position in the linked list is physically and semantically separate from the reference count of the node. Thus, to delete a node, the node must be removed from the linked list and then the reference count must be examined to determine if the node can be destroyed. Since this requires two operations, it is possible that two separate processes can interfere with each other if the information is not synchronized.

SUMMARY OF THE INVENTION

A method and apparatus are provided for an efficient lock-free, non-blocking hash table. Under one aspect, a linked list of nodes is formed in the hash table where each node includes a protected pointer to the next node in the list and a reference counter indicating the number of references currently made to the node. The reference counter of a node must be zero and none of the protected pointers in a linked list can be pointing at the node before the node can be destroyed. In another aspect of the invention, searching for a node in the hash table with a particular key involves examining the hash signatures of nodes along a linked list and only comparing the key of a node to a search key of the node if the hash signature of the node matches a search hash signature. This dramatically speeds up hash list traversals by avoiding unnecessary explicit key comparisons and expensive modifications to the node's reference counter.

A further aspect of the present invention marks nodes for unlinking before actually unlinking the node. Any process that traverses to a node marked for unlinking must attempt to unlink it before proceeding. This helps to ensure that nodes are unlinked in a sequential manner.

Another aspect of the present invention utilizes counters in the protected pointers to ensure that a node is not removed from a linked list by one process but then reinserted into the list in the same position by another process without detection. Each time a pointer is changed, its modification counter is incremented.

Under other embodiments of the invention, the reference counter includes a generation field that is incremented each time a node is removed from a linked list and is added to a list of free nodes. This generation counter is provided to each process that requests a pointer to the node. When releasing the pointer, the process provides the generation counter. This generation counter is compared to the counter in the reference counter. The reference counter is then only decremented if the generation counters match. If the generation counters do not match, a double release error is generated. This helps to stop the propagation of double release errors into future instances of the same node.

In a further aspect of the invention, the reference counter includes a node state that provides a connection between the semantically independent reference counter and pointer to the next node. The possible states of the node include live, deleted, unlinked, and dead.

The invention has application to hash tables but also to single-linked lists, sets, binary trees, n-way trees, arbitrary unmarked graphs, and arbitrary marked graphs.

DETAILED DESCRIPTION OF ILLUSTRATIVE EMBODIMENTS

Figure 1:
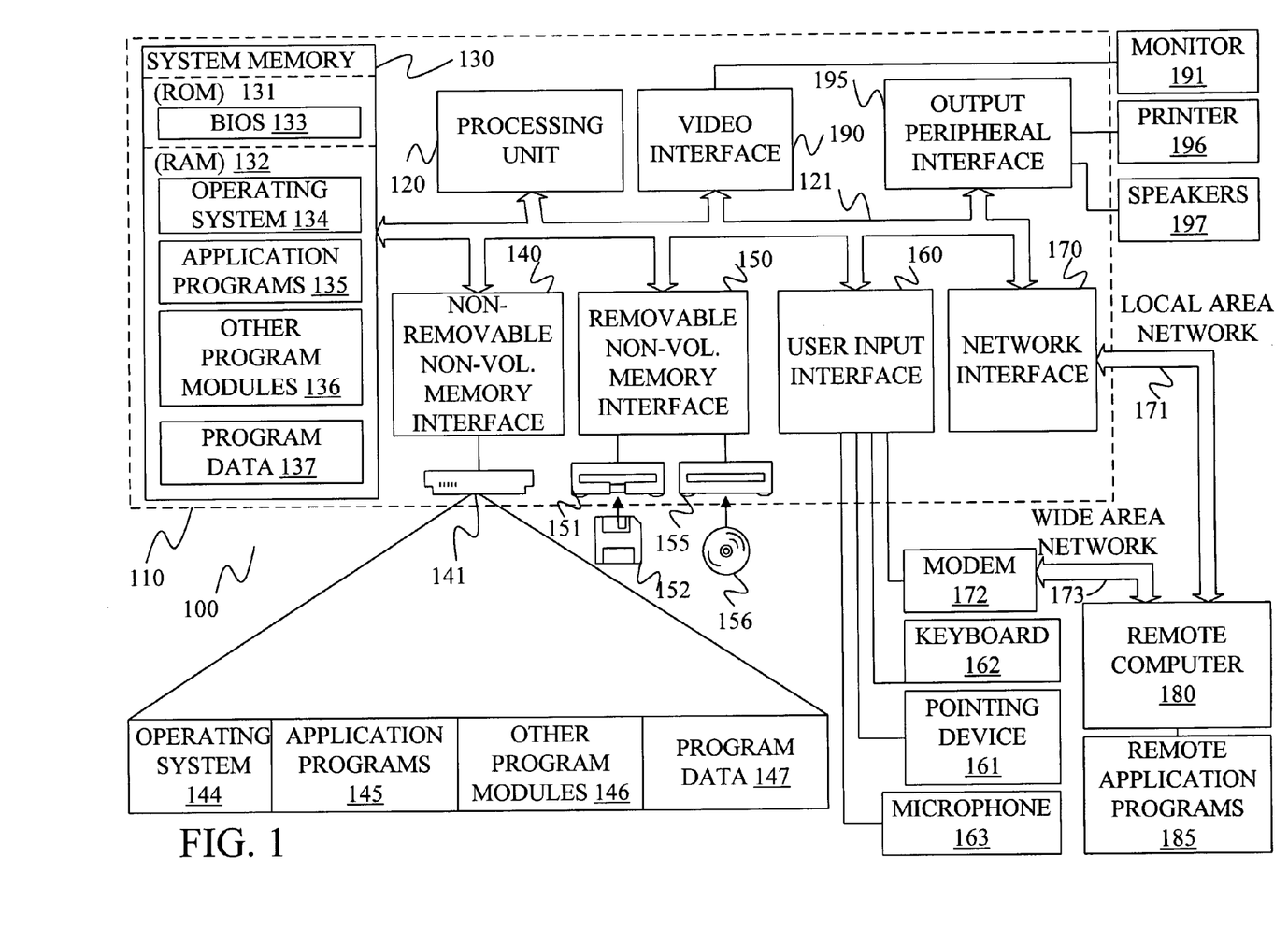
FIG. 1 is a general block diagram of a computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Embodiments of the present invention provide a lock-free, non-blocking hash table and hash table operations that can be used by a multi processor or multi-threaded system. Each thread on each processor that accesses the hash table operations can be referred to as a process.

Figure 2:
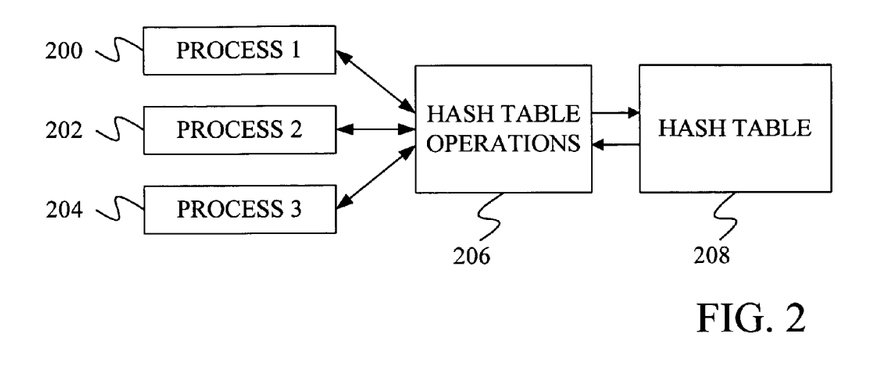
FIG. 2 is a block diagram showing multi-threaded access to hash table function.

In FIG. 2, a block diagram is provided showing three processes 200, 202 and 204 accessing hash table operations 206, which are used to insert, find, and delete data entries in a hash table 208. Processes 200, 202, and 204 may be executed on the same processor in parallel or across multiple processors. Under the present invention, hash table operations 206 are designed so that hash table 208 is not locked for any one process nor are any of the processes blocked from running a hash table operation. In addition, hash table operations 206 are designed to minimize the number of interlocked operations that are performed while traversing the hash table. Further, hash table operations 206 remove the need for a system-wide memory management strategy such as garbage collection or a memory management strategy that must be implemented in each of processes 200, 202 and 204. Instead, hash table operations 206 implement memory management of the hash table nodes internally, thereby allowing the hash table operations to be applied in any environment.

Figure 3:
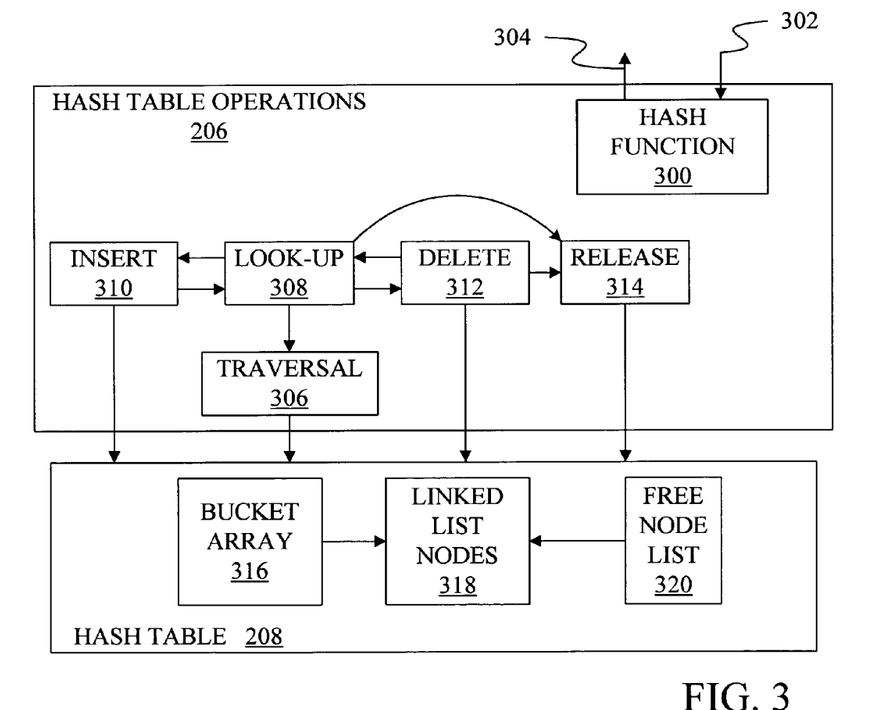
FIG. 3 is a block diagram of hash table functions and the hash table memory under one embodiment of the present invention.

FIG. 3 provides a more detailed block diagram of hash table operations 206 and hash table 208. Hash table operations 206 include hash function 300, which produces a hash signature 304 from a key 302. Techniques for forming such hash signatures are well known in the art.

Additional operations in the hash table operations include traversal 306, look-up 308, insert 310, delete 312, and release 314. Traversal 306 is used to traverse through a linked list headed by a head node found in bucket array 316. The head node is found by applying the hash signature 304 to a modulo N function to index the head node in bucket array 316.

Traversal operation 306 is not called directly, but instead is used by look-up operation 308, which looks for a node containing a particular key. The look-up operation can be called directly or can be called by insert operation 310 or delete operation 312.

Insert operation 310 inserts a new node into a linked list for a data key. Insert operation 310 uses the look-up operation to ensure that a node does not already exist in the hash table for the key that is to be added.

Delete operation 312 uses look-up operation 308 to find a node containing a particular key. Once look-up operation 308 has located the node, delete operation 312 deletes the node from the hash table.

Lastly, the hash table operations include a release operation 314 that releases a process's reference to a node.

Each of the hash table operations is described in more detail below.

In addition to bucket array 316, hash table 208 also includes linked list nodes 318 and free node list 320. Under one embodiment, linked list nodes 318 is a collection of a set of data structures that are set aside in memory to be used as nodes in the hash table. Some of the data structures represent active nodes that form part of a linked list in the hash table. Other data structures represent free nodes that are not currently assigned to a linked list, but which can be added to a linked list simply by changing a pointer of one of the nodes in the linked list to point to a free node and changing a pointer in the free node to point to another node in the linked list. Free node list 320 includes pointers to all of the nodes in memory that are not currently part of a linked list and that are no longer referenced by a process.

Figure 4:
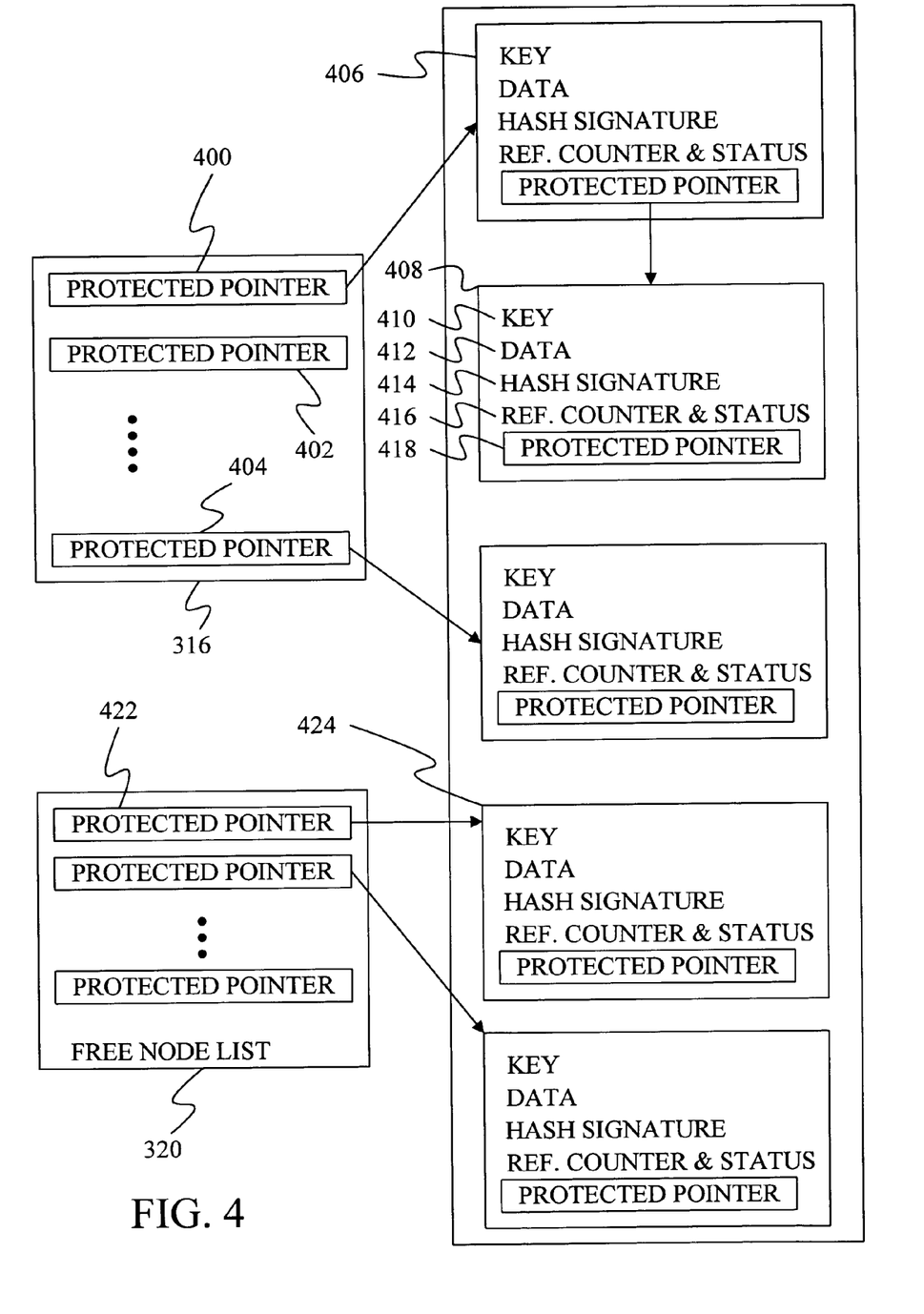
FIG. 4 is a more detailed block diagram of a hash table memory under the present invention.

FIG. 4 provides an expanded diagram of hash table 208. In FIG. 4, bucket array 316 is shown as containing a set of protected pointers such as protected pointers 400, 402 and 404. Each protected pointer is indexed by value that is calculated by applying hash signature 304 to a modulo function based on the number of buckets in bucket array 316. For example, if there were one thousand buckets in the bucket array, the value would be calculated as the hash signature modulo 1000.

Under the present invention, a protected pointer includes two fields. The first field is a modification counter and the second field is a pointer. Each time the pointer is changed, the modification counter is incremented. This is done to help detect changes in the linked list. In particular, the counter helps to detect an event where one process is about to take action on a node but before it can take the action, another process deletes the node followed by a third process reinserting the node at the same position. Without the modification counter, the protected pointer that points to this node would still be the same and the first process would not detect that the node had been deleted and reinserted. By examining the modification counter, however, the first process is now able to detect that something has occurred with the node. It can then re-establish that it has the proper node with the proper key.

Linked list nodes 318 include nodes such as nodes 406 and 408, which form part of a linked list that is headed by head protected pointer 400. Each node includes a data structure having a key 410, data 412, a hash signature 414, a reference counter and status indicator 416 and a protected pointer 418. Protected pointer 418 points to the next node in the linked list and is null if this node is the last node in the list.

Reference counter and status indicator 416 indicates the number of processes that have an active reference to the node as well as indicating the status of the node. Possible statuses for the node include live, deleted, unlinked and dead. A node is marked as live if and only if its reference counter is not 0 and the node is included in the hash chain list. A node is deleted if it has been semantically deleted from the hash table. Note that a deleted node may still be present in the hash chain linked list. An unlinked node is a deleted node that was successfully unlinked from a hash chain linked list but that is still referenced by at least one process and therefore has a reference counter greater than 0. A dead node is a node that has a reference count of 0. Like a deleted node, a dead node may still be part of the hash chain linked list.

A node starts with a reference counter/status of (C=1, S=LIVE). Each time a new reference is made to a node, the reference counter/status changes to (C+1, S) as long as it had a count C>0 and a status of LIVE before the new reference. When a reference to a node in state (C, S) is released without deletion of the node, the state changes to:
  A. (C−1, S) if C>1 and S=LIVE
  B. (C−1, S) if C>0 and S=DELETED
  C. (C−1, S) if C>1 and S=UNLINKED
  D. (0, DEAD) if C=1 and S=UNLINKED Any other combination of reference count and status during a release of a node indicates some type of problem such as a double release or memory corruption.

When a reference to a node in state (C, S) is released with deletion, the state changes to:
  A. (C−2, DELETED) if C>1 and S=LIVE
  B. (C−1, S) if C>0 and S=DELETED (Warning: Node Already Deleted)
  C. (C−1, S) if C>1 and S=UNLINKED (Warning: Node Already Deleted)
  D. (0, DEAD) if C=1 and S=UNLINKED (Warning: Node Already Deleted Any other reference count/status combination before a release with deletion of the node indicates a problem such as double release or memory corruption.

If a process encounters a Dead node or changes a node to a Dead status from a Live status, it attempts to mark the node for unlinking, tries to unlink the node, and if successful, destroys the key/data pair and returns the node to a free list (described below). If a process encounters a Deleted node, it attempts to mark the node for unlinking, tries to unlink the node, and if successful, changes the node state to:

A. (C, Unlinked) if C>0
B. (0, Dead) if C=0

When a process changes a node's status to Dead from Deleted or Unlinked, the process destroys the key/data pair and returns the node to the free list.

Free node list 320 includes a list of protected pointers that point to nodes in linked list nodes 318 that are not part of a linked list and are no longer referenced by any process. For example, free node list 320 includes protected pointer 422 which points to free node 424.

After a node has its status changed to dead and it has been removed from the linked list, a pointer to the node is added to free node list 320. In addition, under some embodiments, a field in the reference counter and status indicator is incriminated. This additional field is a generation field that is incremented each time a node is returned to the free node list. This generation counter allows an instance of a node in a linked list to be distinguished from a previous instance when the same node may have been used in the same list earlier.

The generation counter helps to stop the propagation of errors created by double releases in which an application releases a nodes more times than it requested references to the node. To prevent the propagation of such double release errors, the generation counter is provided to any process that requests a reference to a node. When the process releases the node, it includes the generation counter with the request to release the node. The generation counter is then compared to the current generation counter in the node. If they do not match, the release fails and a double release error is issued to the process that requested the release. As a result, releases associated with a previous incarnation of a node will not be propagated forward into later incarnations of the same node. This helps to build a barrier for errors generated by double releases.

Note that under the prior art, such double release errors could propagate through many instances of the same node. This made it very difficult to detect where the double release error was introduced and thus made it difficult to "debug" programs. Double releases also dramatically reduce program stability and longevity. In particular, double releases can lead to a cascade of other types of errors such as resource leaks and may render an application or system unusable in a short time.

The individual objects in each node, such as key 410 and data 412, may have separate reference counters for the objects. Under the present invention, these reference counters are superceded by the reference count for the node. As a result, instead of adjusting the reference count of the individual objects in a node, the reference count for the node itself is adjusted. In practice, this means that only one expensive interlocked operation is needed per node access instead of potentially many more if the reference counters of the individual objects were updated.

Figure 5:
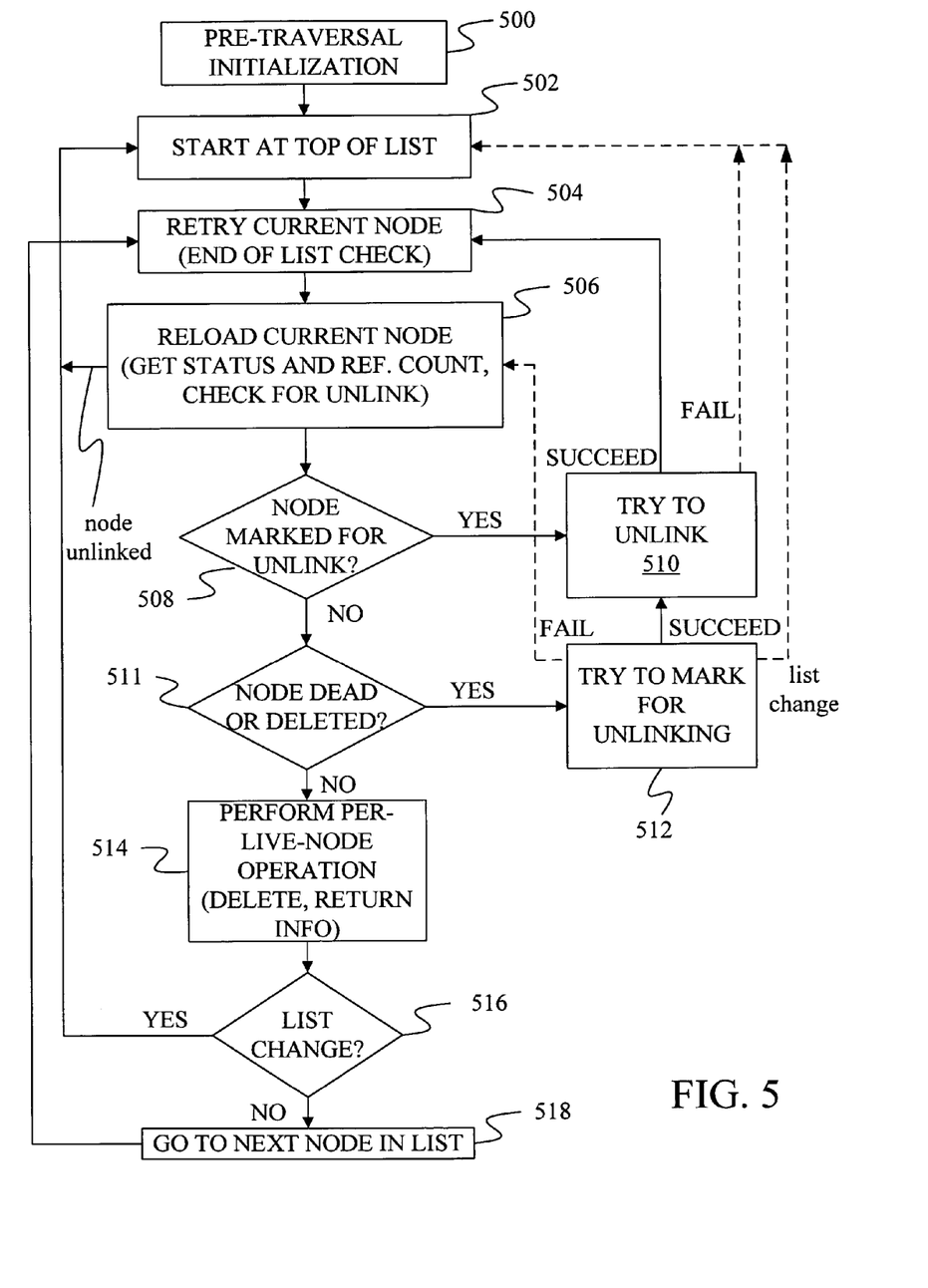
FIG. 5 is a flow diagram of a linked list traversal function under one embodiment of the present invention.

FIG. 5 provides a flow diagram of the traversal operation of FIG. 3. The traversal operation is discussed first since it is utilized by many of the other functions to move through a hash chain linked list.

At step 500, pre-traversal initialization takes place. During this initialization, the pointer for the head node for the hash chain list is identified by applying the modulo of the hash signature to bucket array 316.

At step 502, the value of the protected pointer at the head of the hash chain list is copied into a local variable referred to as the current pointer, which is a pointer designated to point to a current node. Through this assignment, the node pointed to by the current pointer becomes the current node. In addition, the address of the pointer that was copied to form the current pointer value is stored. Thus, at step 502, the address of the pointer at the head of the hash chain list is stored.

At step 504, the system checks to see if the current node is null, indicating that the end of the list has been reached. To do this, the present invention uses the steps of FIG. 6.

Figure 6:
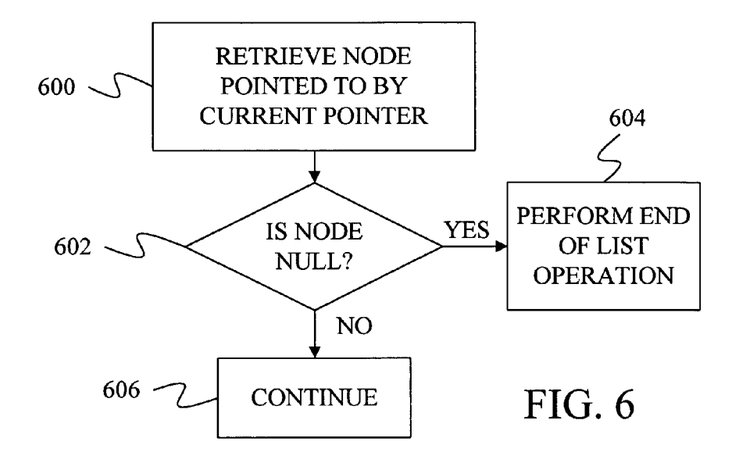
FIG. 6 is a flow diagram checking for the end of a linked list in the traversal of FIG. 5.

In step 600 of FIG. 6, the current pointer is used to retrieve the node pointed to by the current pointer. If the retrieved node is null in step 602, there are no more nodes in the linked list and an end of list operation is performed in step 604. For a look-up operation, this end of list operation involves returning an indication that no match was found for the key. For an insertion, this end of list operation involves inserting a new node into the hash chain linked list since the key for the node to be inserted was not found in the hash chain list. Performing this end of list operation for insertion is discussed in more detail in connection with FIG. 12. For the deletion operation, the end of list operation returns an error indicating that the key to be deleted was not found in the linked list.

If the pointer is not null in step 602, there is another node in the list to process. As such, the process continues to step 606.

Returning to FIG. 5, at step 506, values stored in the current node are loaded into local variables from the node. This is done using a series of steps as shown in FIG. 7.

Figure 7:
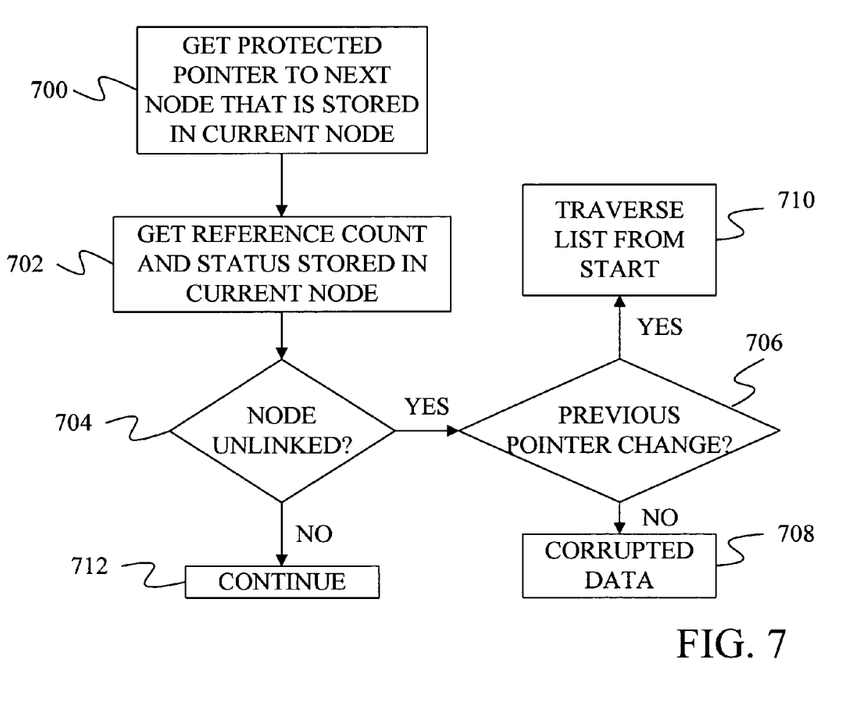
FIG. 7 is a flow diagram of steps for re-loading a current node in the traversal of FIG. 5.

At step 700 of FIG. 7, the protected pointer to the next node that is stored in the current node is copied into a local variable. At step 702, the reference count and status for the current node is retrieved. At step 704 the status is examined to determine if the node has been unlinked. If the node has been unlinked, the process continues at step 706 where the current pointer is compared to the value that is currently stored at the location from which the current pointer was last set. For example, if the current pointer was set from the pointer at the head of the linked list, the value of the current pointer would be compared to the current value of the pointer at the head of the linked list. This comparison is done because the protected pointer that had pointed to the current node when the current pointer was set should change if the current node has been unlinked from the linked list and will no longer point at the current node but at some other node that is still in the linked list. If the pointer that had been pointing to the current node has not changed, the hash chain linked list has become corrupted as indicated by step 708.

If the previous pointer did change at step 706 the process returns to traverse the list from the start at step 710 by returning to the top of the list at step 502 of FIG. 5.

If the node has not been marked as unlinked at step 704, the process continues at step 712.

Returning to FIG. 5, after the current node has been loaded, the protected pointer to the next node that was retrieved from the current node is examined at step 508 to determine if the current node has been marked for has been marked for unlinking. Under embodiments of the present invention, a node is marked for unlinking by changing a bit in a field present in the protected pointer in the current node. Once a node has been marked for unlinking, any process that encounters the node while traversing the list must attempt to unlink the node. This prevents faster processes from unlinking the node after the current node before the current node has unlinked. This helps to prevent a problem known as ABA in which two processes try to unlink two consecutive nodes at the same time. The first process attempts to change the pointer before node A so that it points at node B. The second process attempts to change the pointer in node A so that is points to node C that follows node B. If these two events happen concurrently, there will be a pointer to node B leaving an illegal reference to node B, which was successfully "removed" by the change in pointers performed by the second process.

If a node is marked for unlinking at step 508, the process attempts to unlink this node at step 510.

Figure 8:
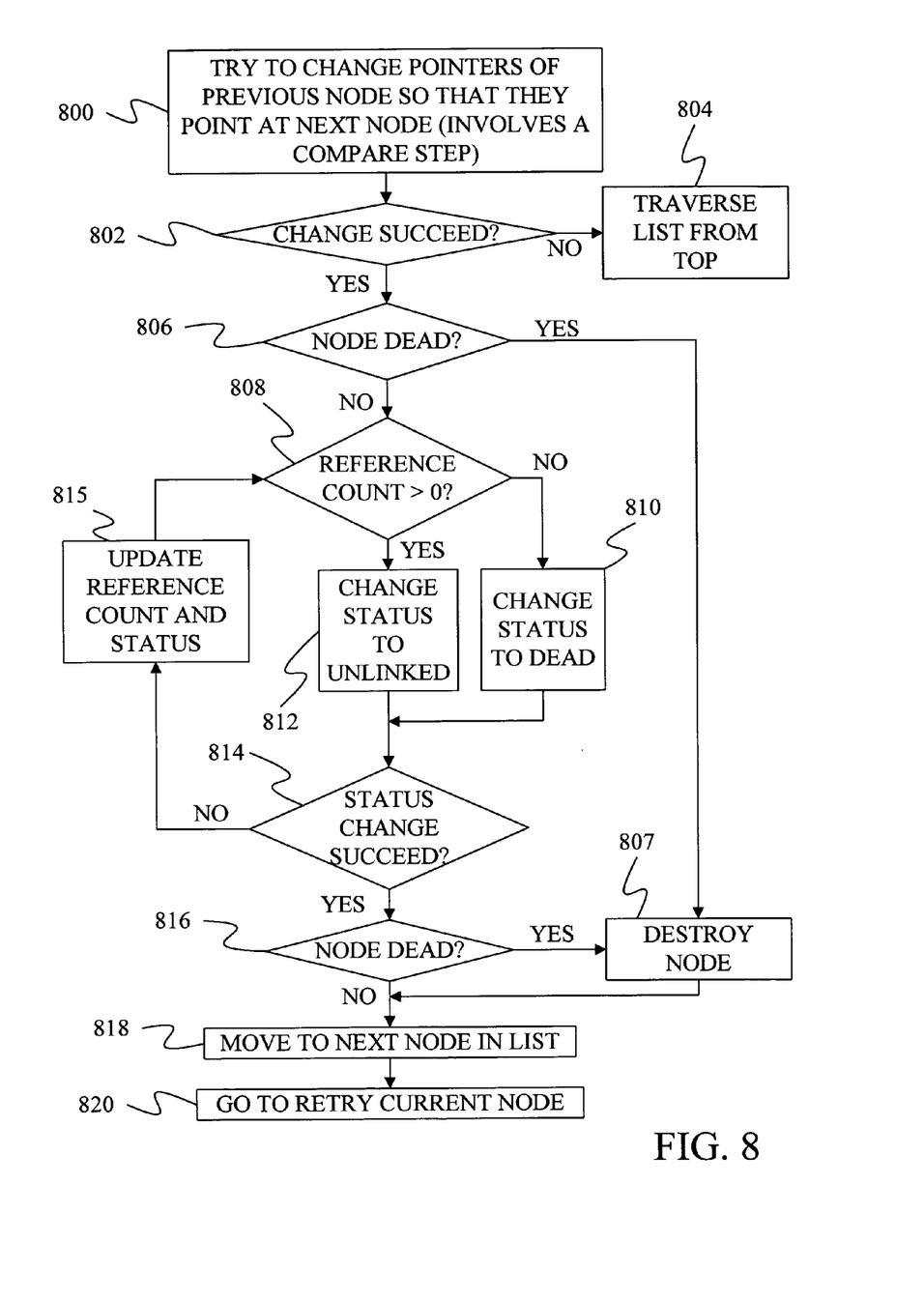
FIG. 8 is a flow diagram for the step of attempting to unlink a node shown in FIG. 5.

The process for unlinking a node represented by step 510 in FIG. 5 is shown in the flow diagram of FIG. 8. In step 800 of FIG. 8, an interlocked compare-and-swap operation is performed on the address where the current pointer was loaded from in an attempt to change the pointer so that it will point to the next node after the current node. In the interlocked compare-and-swap operation, the value at the address is compared to the value of the current pointer. If the value at the address is no longer the same as the value of the current pointer, some other process has changed the linked list. As a result, the interlocked compare-and-swap fails at step 802 and the pointer is not changed. If the change does not succeed at step 802, the process returns to step 502 of FIG. 5 and traverses the list from the beginning of the list once again as indicated by step 804 of FIG. 8.

Such a change to the linked list will normally occur when some other process has managed to unlink the current node. Thus, the traversal begins again with the hope that the node that had been marked for unlinking will no longer be present in the list on the next traversal through the list.

If the change to the pointer that had pointed to the current node succeeds at step 802, the current node is examined to determine whether the node is dead by examining the status indicator for the node. This is done at step 806. If the node is dead at step 806, the node is destroyed at step 807 by destroying the key of the node and adding a pointer to the node to the free node list. Note that under some embodiments, when the node is returned to the free node list, the generation counter is incremented by one.

If the node is not dead at step 806, the reference count of the node is examined to determine if any applications are still referring to the node. If the reference counter is not greater than 0, the status of the node is set to dead at step 810. If the reference counter is greater than 0, the status of the node is set to "unlinked" at step 812.

In both step 810 and step 812, the status is changed by performing an interlocked compare exchange operation on the reference counter and status indicator for the node. This operation returns the value currently stored in the node for the reference counter and the status indicator if the setting operation fails.

After steps 810 and 812, the process continues at step 814 where a determination is made as to whether the change in the status succeeded. Note that the status change will not succeed if some other process has changed the reference count of the node since the reference count was loaded in step 506. If the status change does not succeed at step 814, the process updates the local reference count and status variables with the current values recovered from the interlocked operation at step 815. The process then returns to step 808 to determine if the current reference count is greater than zero. Steps 808, 810, 812 and 814 repeat until the change in status succeeds.

Once the status has been changed, the status is examined in step 816 to determine if the node is dead. If the node is dead, the process continues at step 807 where the dead node is destroyed by destroying its key and adding the node to the free node list.

After steps 816 or 807, the process continues at step 818 where it moves to the next node in the hash chain list by setting the current pointer variable equal to the value stored in the protected pointer of the current node. The process then returns through step 822 to step 504 where it examines the new current node to determine if the end of the hash chain list has been reached.

Returning to FIG. 5, if the current node is not marked for unlinking at step 508, the status of the node is examined to determine if the node is dead or deleted at step 511. If the node is dead or deleted, the process continues at step 512 where it attempts to mark the node for unlinking.

Figure 9:
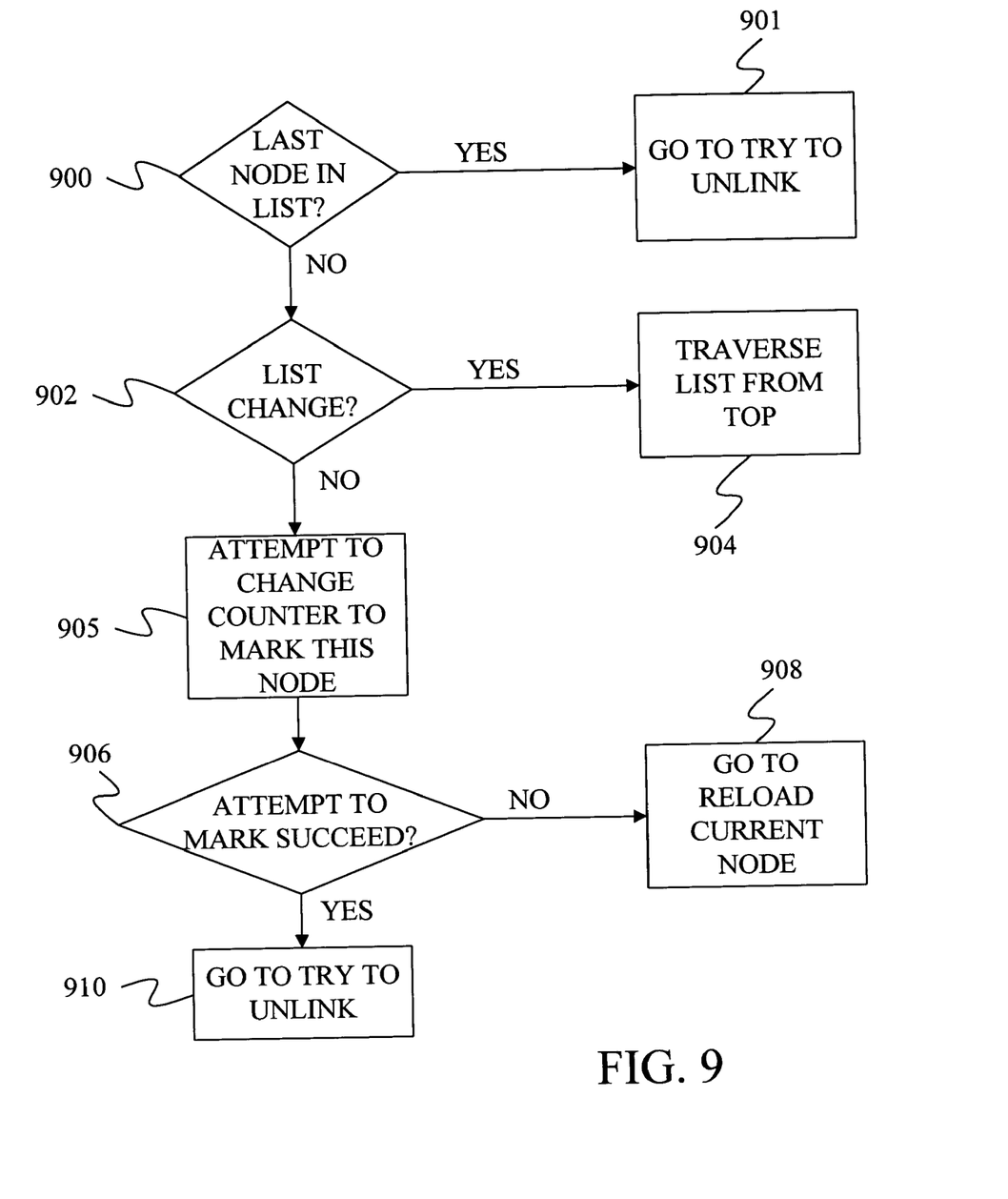
FIG. 9 is a flow diagram for the step of trying to mark a node from unlinking in the flow diagram of FIG. 5.

The process represented by step 512 in FIG. 5 is shown in the flow diagram of FIG. 9. The process begins at step 900 where it determines if the current node is the last node in the hash chain linked list. If this is the last node, it immediately tries to unlink the node by passing though step 901 to step 510 and the process described in FIG. 8. The last node in a hash chain linked list can be unlinked directly without marking it for unlinking since there are no nodes after it which could create the ABA problem discussed above.

If this is not the last node in the linked list at step 900, the pointer that was used to load the value of the current pointer is examined at step 902 to determine if the list has changed. If the protected pointer that had pointed to the current node is different than the current pointer, the list has changed. A change to the protected pointer can involve a change to pointer itself or a change to the counter, which is also present in the protected pointer. If the list has changed at step 902, the traversal is re-started as indicated by step 904 by returning to step 502 and beginning from the start of the hash chain linked list.

If the linked list has not changed at step 902, the process continues with step 905 where a field in the counter of the protected pointer found in the current node is changed. This involves a compare-and-swap operation in which the value of the protected pointer stored in the current node is compared to a value that was taken from the node during the reloading of the current node at step 506. If the protective pointer of the current node has changed since step 506, the attempt to mark the node fails.

If the attempt to mark the node fails at step 906, the process returns to reload the current node at step 908 by returning to step 506 of FIG. 5. The attempt to mark the node will fail if some other process has marked the node.

If the attempt to mark the node succeeds at step 906, the process continues at step 910 by trying to unlink the marked node by returning to step 510 of FIG. 5.

If the node is not dead or deleted at step 511, the process continues at step 514 where a per-live-node operation is performed. Such operations include examining the hash signature and key of the node to determine if it matches a desired key.

After the live-node operation has been performed, the process continues at step 516 where the pointer that was used to load the current pointer is compared to the current pointer to see if the pointer has changed. If the pointer has changed, the process returns to step 502 to start the traversal at the beginning of the list since a change in this pointer indicates a change in the list. If the list has not changed at step 516, the process continues at step 518 where it moves to the next node in the list by setting the current pointer to the value of the protected pointer stored in the current node. The process then returns to step 504 to determine if the end of the linked list has been reached.

Figure 10:
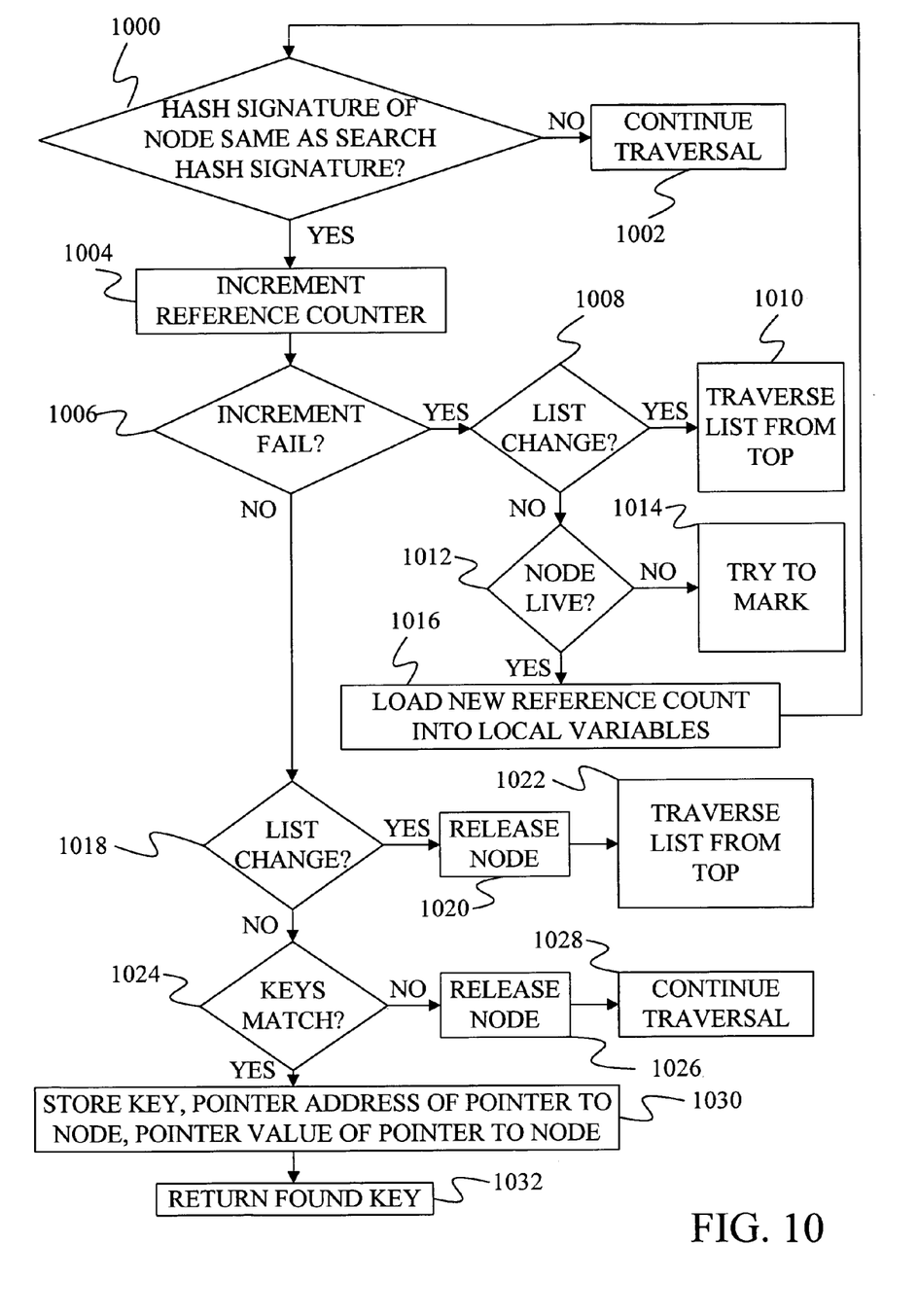
FIG. 10 is a flow diagram of a look up function under one embodiment of the present invention.

FIG. 10 provides a flow diagram of the look-up operation of one embodiment of the present invention. Under this embodiment of the invention, the look-up operation utilizes the traversal function to move to a live node. Once at a live node, the flow diagram of FIG. 10 is performed to determine if the node matches the desired key.

The process of FIG. 10 begins with step 1000 where the hash signature of the node is compared to the search hash signature associated with the search key. The hash signatures are the values produced by the hash function from the key before applying a modulo function. The hash signatures are compared instead of the keys because before comparing the key for the node to the search key, the reference counter should be incremented to indicate the current operation is utilizing the current node. However, incriminating the reference counter requires an expensive interlocked operation.

To avoid this operation where it is not needed, the present invention compares the hash signatures before comparing the keys because the reference count does not need to be incremented to compare the hash signatures. As such, step 1000 can be performed simply by comparing the stored hash signature to the search hash signature.

If the two hash signatures do not match at step 1000 the key comparison process ends and hash list traversal continues at step 1002 by moving to step 516 of FIG. 5. If the two hash signatures do match, the reference counter is incremented at step 1004. This involves using an interlocked operation in which the previously stored value for the reference counter that was loaded at step 506 is compared against the current value of the reference counter at step 1004. If the reference counter or status has changed since they were loaded at step 506, the increment of the reference counter will fail at step 1006. This could happen if someone has changed the reference counter due to releasing or accessing the node.

If the increment of the reference counter fails at step 1006, the process continues at step 1008 where the protected pointer that had been pointing at the current node is examined to see if it has changed. If this protector pointer has changed, the list has changed and the process continues at step 1010 where it returns to the top of the hash chain list by returning to step 502 of FIG. 5.

If the list has not changed at step 1008, the current status of the node is examined at step 1012 to determine if the node is still live. The current status of the node and the current reference count of the node are returned during the attempt to increment the reference counter, even if the increment fails. If the current node is not live, the process tries to mark the node for unlinking at step 1014 by proceeding to step 512 of FIG. 5.

If the current status of the node is live at step 1012, the current reference count and status for the node is loaded into a local variable at step 1016. The process then returns to step 1000 to determine if the hash signature of the current node is the same as the hash signature that is being searched for.

If the increment of the reference counter does not fail step 1006, the process continues with step 1018 where the protected pointer that had been pointing at the current node is examined to determine if it has changed. If the protected pointer has changed at step 1018, the current node is released at step 1020 before returning to traverse the list from the beginning of the list as indicated by step 1022. The process for releasing a node is discussed further below.

If the list has not changed at step 1018, the key of the node is compared to the search key at step 1024. If the keys do not match, the node is released at step 1026 as discussed further below.

If the keys match at step 1024, the key, the address of the pointer to the node, and the pointer value of the pointer to the node are stored. These values are stored for later release of the node. Note that in addition to these values, a generation counter can be stored and compared during the release to ensure that double release errors do not propagate into a future instance of this node. The pointer to the node is returned to the calling application at step 1032.

Figure 11:
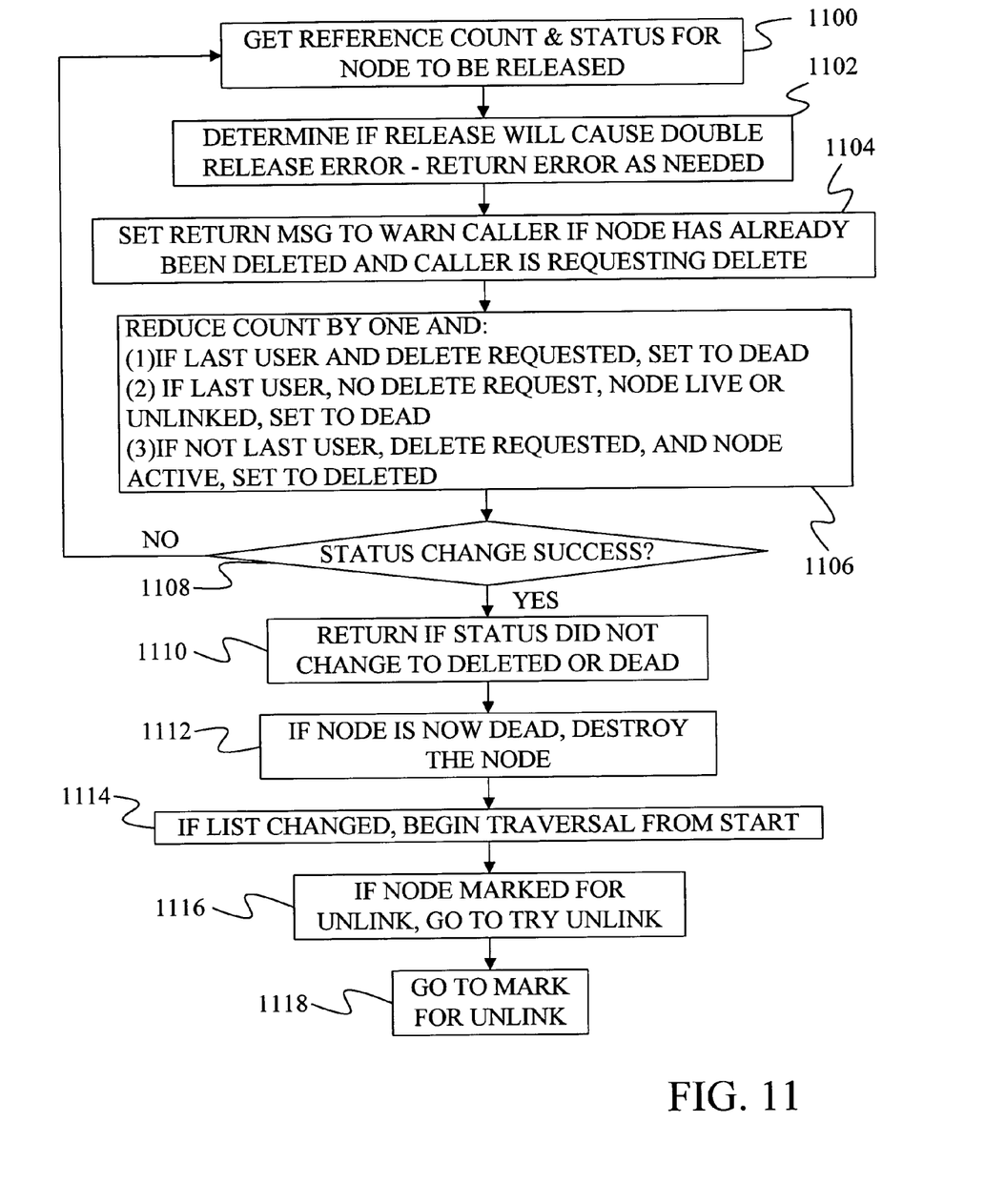
FIG. 11 is a flow diagram for releasing a node under one embodiment of the present invention.

Steps 1020 and 1026 for releasing the node are shown in the flow diagram of FIG. 11. This process begins at step 1100 where the reference count and status for the node to be released is obtained from the node. This status is stored for later use. At step 1102 a determination is made as to whether this release will cause a double release error. This will occur if the node is Live and the reference count is one or less, the node is either Deleted or Unlinked and its reference count is zero, or the node is Dead. The process continues at step 1103 where a return message is sent to warn the caller if a node has already been deleted and the caller is requesting a delete. Note that this internal release procedure allows the caller to designate that the node should be released and deleted from a hash chain list. Alternatively, the caller can simply indicate that they wish to release the node and not affect whether it remains in a hash chain linked list.

At step 1106, the process attempts to reduce the reference counter by two if the node is LIVE and delete was requested or by one otherwise and change the status based on a number of factors. First, if the reduction in the reference count will place the reference count at 0 and a delete was requested, the status is set to dead. If reducing the reference count by one will set the reference count to 0 and no delete was requested, and node is Live or Unlinked, the node's status is set to dead. If the reference counter will remain above 0 after reducing the count by 1, a delete was requested and the node is currently live, the node's status is changed to deleted. Note that an attempt to release a node that is dead is illegal and will cause immediate termination of the release process with a double release notification.

At step 1108 the process determines if the status change succeeded. The status change will fail if the reference count or status of the node changed since step 1100.

If the change to the reference counter and status does not succeed at step 1108, the process returns to step 1100 to obtain the current reference counter and status for the node to be released. Step 1100, 1102, 1104 and 1106 are then repeated.

If the reference count and status change succeeds at step 1108 the process continues at step 1100 where it returns if the status did not change to deleted or dead. If the status did change to deleted or dead, the process continues at step 1112 where the node is destroyed if it is now dead.

After step 1112, the process continues to step 1114 where the protected pointer that had been pointing at the current node is examined to determine if it has changed. If it has changed, the process skips to step 502 of FIG. 5 to start the traversal from the beginning of the list.

If the list has not changed at step 1114, the current node is examined to determine if it is marked for unlinking. If it is marked for unlinking at step 1116, the process proceeds to step 510 of FIG. 5 to try to unlink the node.

If the node is not marked for unlinking at step 1116, the process continues at step 1118 where the node is marked for unlinking by proceeding to step 512 of FIG. 5.

Returning to FIG. 10, if the process returns to step 1020 after releasing the node, the node is either live or unlinked. Thus, the process continues by traversing from the top of the list at step 1022. If the process returns to step 1026 after the process of FIG. 11, the current node is either unlinked or live. The process then continues at step 1028 where the traversal through the hash chain linked list continues at step 516 of FIG. 5.

To delete a node, the look-up process of FIG. 10 is performed to find the node that should be deleted. Once the node is found, the pointer to the node is sent to the internal release procedure of FIG. 11 along with a request to delete the node. The process of FIG. 11 is then performed.

Figure 12:
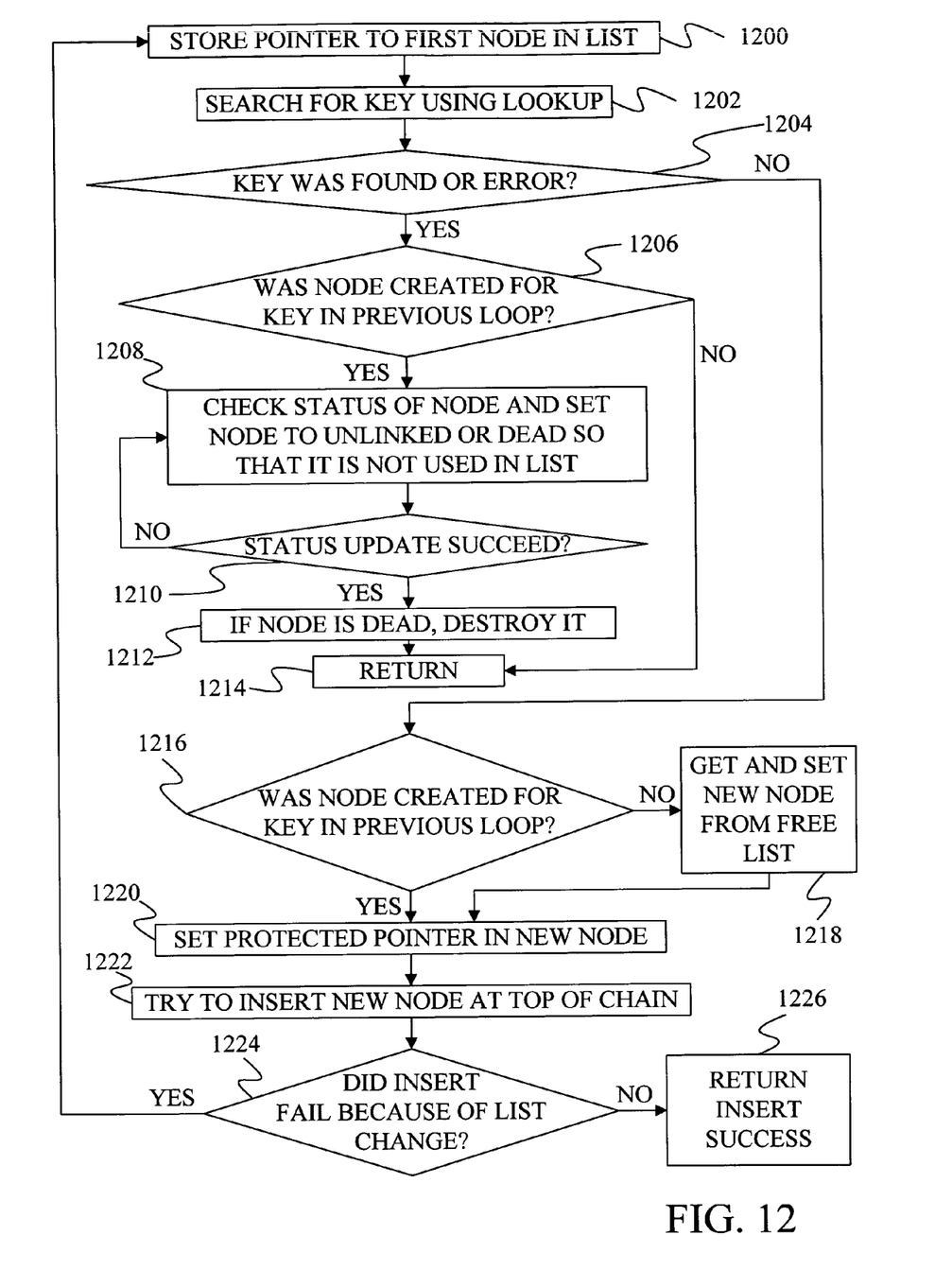
FIG. 12 is a flow diagram for inserting a node under one embodiment of the present invention.

The process for inserting a new node into a hash chain list is shown in FIG. 12. At step 1200, the proper hash chain list is identified using the modulo of the hash signature. At step 1202, the look-up procedure of FIG. 10 is used to search for the key that is to be inserted. Since no key can be inserted twice in two different nodes in the hash table, the key should not be found in the current hash table.

If the key is found at step 1204, or an error has occurred during the look up, the process continues at step 1206 where it is determined whether a node has been created for this key during the insert process.

If a node was created for the key, the status of the node is checked at step 1208. The status is then changed to unlinked or dead so that it is not used in the list. If the status update does not succeed at step 1210, the status is checked again and is updated again to either unlinked or dead. Steps 1210 and 1208 are repeated until the status update succeeds.

Once the status update has succeeded at step 1210, the process continues to step 1212 where the node is destroyed if it is dead. After the node has been destroyed, or after step 1206 if no node was created, the process continues at step 1214 where it returns an error message indicating that the key is already present in the hash table.

If the key was not found in the hash table at step 1204 the process continues at step 1216 where it determines whether a node was created for the key in a previous loop of the insertion process of FIG. 12. If a node was not created, a new node is acquired from the free node list at step 1218.

At step 1220, the protected pointer in the new node is set so that it points to the node pointed to by the head of the hash chain list. This new node can either be a node that was created for the key in a previous loop through the insertion process or the node created at step 1218.

At step 1222, the new node is inserted into the top of the chain by performing an interlocked compare-and-swap operation on the protected pointer at the head of the hash chain list. In particular, the compare-and-swap compares the current value of the protected pointer at the head of the hash chain list to the value that was loaded at step 1200. If this value is the same as it was at step 1200, it is replaced with a new protected pointer that points to the new node. If the protected pointer at the head of the hash chain list was not the same as it was at step 1200 the insertion fails at step 1224 and the process returns to step 1200 to acquire the current value of the head of the hash chain list. The steps of the insertion loop are then repeated.

If the insertion does not fail at step 1224, a success value is returned to the calling application at step 1226.

Although the present invention has been described with reference to hash tables, aspects of the present invention may be practiced with other data structures. For example, the invention may be used with linked lists by assuming a hash signature of zero for all keys. The invention may be used with sets when the sets are represented as hash tables. The invention may be used with binary and n-way trees and arbitrary unmarked graphs by using a hash key consisting of a parent node, child index pair and a data node consisting of a pointer to a respective node in the graph. The invention may be used with arbitrary marked graphs by using a key consisting of a parent node, edge mark pair and a data node consisting of a pointer to a respective node in the graph.

Although the present invention has been described with reference to preferred embodiments, workers skilled in the art will recognize that changes may be made in form and detail without departing from the spirit and scope of the invention.

What is claimed is:

1. A computer-readable medium having stored thereon a data structure representing a linked list in a hash table, comprising:
    a key field providing an identifier for data stored in a node in the linked list;
    a protected pointer field comprising a pointer that functions to indicate that a node is part of the linked list when the pointer points to the node and the protected pointer field is in the linked list; and
    a reference counter field comprising a reference counter that indicates the number of references currently made to a node, such that the reference counter must be zero and none of the protected pointers in the linked list can be pointing to the node before the node can be destroyed.

2. The computer-readable medium of claim 1 wherein the protected pointer field further comprises a counter that is changed whenever the pointer is changed.

3. The computer-readable medium of claim 1 wherein the reference counter field further comprises a status indicator field that indicates the current status of the node.

4. The computer-readable medium of claim 3 wherein the status indicator field indicates one of a status of live, deleted, dead, or unlinked.

5. The computer-readable medium of claim 3 wherein the reference counter field further comprises a generation counter field that is incremented each time the node is destroyed.

6. The computer-readable medium of claim 1 further comprising a protected pointer field within a node that points to another node in the linked list.

7. The computer-readable medium of claim 6 wherein the protected pointer field in a node further comprises a marking field that indicates whether the node should be removed from the linked list before the node is actually removed from the linked list.

8. The computer-readable medium of claim 7 wherein the marking field is not set to indicate that the node should be removed from the linked list before the node is removed from the linked list if the node is the last node in the linked list.

9. The computer-readable medium of claim 1 further comprising a hash signature field associated with a node in the linked list, wherein the hash signature field comprises a hash signature formed from the key in the key field.

10. The computer-readable medium of claim 9 wherein the reference counter for a node is incremented before comparing the key in the key field to a search key.

11. The computer-readable medium of claim 10 wherein the reference counter for a node is not incremented before comparing the hash signature in the hash signature field to a search hash signature.

12. The computer-readable medium of claim 10 wherein the key is an object having an object reference count and wherein the reference counter supercedes the object reference count such that the object reference count does not require modification when a reference to the key object is issued.

13. A method of searching a hash table to find a node containing a search key, the method comprising:
   using the search key to form a search hash signature;
   using the search hash signature to locate the beginning of a linked list of nodes;
   traversing through the linked list of nodes from the beginning of the linked list, traversing comprising at each node:
      comparing the search hash signature to a stored hash signature stored in the node;
      if the search hash signature does not match the stored hash signature, traversing to the next node in the linked list;
      if the search hash signature matches the stored hash signature, comparing the search key to a stored key stored in the node;
      if the search key matches the stored key, returning a pointer to the node; and
      if the search key does not match the stored key, traversing to the next node in the linked list.

14. The method of claim 13 further comprising incrementing a reference counter stored in the node before comparing the search key to the key stored in the node.

15. The method of claim 13 wherein traversing to a next node comprises using a protected pointer stored in a node, wherein the protected pointer comprises a counter and a pointer to the next node.

16. The method of claim 13 wherein traversing further comprises examining an unlink node field in the node before comparing the search hash signature to the stored hash signature to determine if the node has been marked for unlinking from the linked list.

17. The method of claim 16 wherein traversing further comprises removing the node from the linked list if it has been marked for unlinking.

18. The method of claim 13 wherein traversing further comprises examining a status field stored in the node to determine if the node has been deleted.

19. The method of claim 18 wherein traversing further comprises marking a node for unlinking if the status field indicates the node is deleted and the node is not marked for unlinking.

20. The method of claim 13 wherein traversing further comprises examining a status field stored in the node to determine if the node is dead.

21. The method of claim 20 wherein traversing further comprises marking the node for unlinking if the status field indicates the node is dead and the node is not marked for unlinking.

22. The method of claim 13 wherein traversing further comprises before comparing keys, determining if a protected pointer comprising a pointer that was followed to traverse to the node, has changed since traversing to the node.

23. The method of claim 22 wherein the protected pointer further comprises a counter.

24. The method of claim 23 wherein if the protected pointer has changed, traversing further comprises restarting the traversal at the beginning of the linked list.

25. The method of claim 24 wherein the change in the protected pointer comprises a change in the counter.

26. The method of claim 13 further comprising using the returned pointer to the node to change a status of the node to deleted.

27. The method of claim 26 further comprising reducing a reference counter stored in the node by one when changing the status of the node to deleted.

28. The method of claim 27 further comprising determining if this is the last node in the linked list and unlinking the node from the list if it is the last node in the list and marking the node for unlinking if it is not the last node in the list.

29. The method of claim 27 further comprising marking the node for unlinking after changing the status of the node to deleted.

30. The method of claim 29 further comprising unlinking the node from the linked list.

31. The method of claim 29 further comprising examining a reference counter to determine if the node is still being referenced and destroying the node if it is no longer being referenced.

* * * * *